United States Patent [19]

Gupta

[11] Patent Number: 5,995,929
[45] Date of Patent: Nov. 30, 1999

[54] METHOD AND APPARATUS FOR GENERATING AN A PRIORI ADVISOR FOR A SPEECH RECOGNITION DICTIONARY

[75] Inventor: Vishwa Gupta, Brossard, Canada

[73] Assignee: Nortel Networks Corporation, Montreal, Canada

[21] Appl. No.: 08/928,733

[22] Filed: Sep. 12, 1997

[51] Int. Cl.$^6$ ............................ G10L 7/08; H04M 1/64
[52] U.S. Cl. .................. 704/251; 379/88.01; 379/88.03
[58] Field of Search .................................. 704/231, 246, 704/244, 250, 240, 251, 252; 379/88.01, 88.03, 88.04

[56] References Cited

U.S. PATENT DOCUMENTS

| | | | |
|---|---|---|---|
| 4,164,025 | 8/1979 | Dubnowski et al. | 707/533 |
| 4,751,736 | 6/1988 | Gupta et al. | 704/230 |
| 4,751,737 | 6/1988 | Gerson et al. | 704/231 |
| 4,797,910 | 1/1989 | Daudelin | 379/88.01 |
| 4,831,550 | 5/1989 | Katz | 704/240 |
| 4,956,865 | 9/1990 | Lennig et al. | 704/241 |
| 4,959,855 | 9/1990 | Daudelin | 379/213 |
| 4,979,206 | 12/1990 | Padden et al. | 379/88.01 |
| 5,050,215 | 9/1991 | Nishimura | 704/244 |
| 5,052,038 | 9/1991 | Shepard | 379/88.09 |
| 5,086,479 | 2/1992 | Takenaga et al. | 382/157 |
| 5,091,947 | 2/1992 | Ariyoshi et al. | 704/246 |
| 5,097,509 | 3/1992 | Lennig | 704/240 |
| 5,127,055 | 6/1992 | Larkey | 704/244 |
| 5,163,083 | 11/1992 | Dowden et al. | 379/88.03 |
| 5,181,237 | 1/1993 | Dowden et al. | 379/88.03 |
| 5,204,894 | 4/1993 | Darden | 379/88.03 |
| 5,226,044 | 7/1993 | Gupta et al. | 370/435 |
| 5,274,695 | 12/1993 | Green | 379/88.02 |
| 5,307,444 | 4/1994 | Tsuboka | 704/232 |
| 5,390,278 | 2/1995 | Gupta et al. | 704/240 |
| 5,479,488 | 12/1995 | Lennig et al. | 379/88.04 |
| 5,488,652 | 1/1996 | Bielby et al. | 704/231 |
| 5,515,475 | 5/1996 | Gupta et al. | 704/242 |
| 5,553,119 | 9/1996 | McAllister et al. | 379/88.01 |
| 5,644,680 | 7/1997 | Bielby et al. | 704/240 |
| 5,845,245 | 12/1998 | Gupta et al. | 704/231 |
| 5,905,773 | 5/1999 | Wong et al. | 379/88.03 |

OTHER PUBLICATIONS

Gorin et al., "Adaptive Acquisition of Language", Apr. 1991, pp. 101–132, Computer Speech and Language.

Gupta et al., "Fast Search Strategy in a Large Vocabulary Word Recognizer", Jul. 1988, pp.2007–2017.

1989, IEEE International Symposium on Circuits and Systems, vol. 2, May 1989, pp. 1336–1339.

Telesis, Issue 97, pp. 23–32, Unleashing The Potential of Human–To–Machine Communication.

Rabiner and Juang, IEEE ASSP Magazine, Jan. 1986, pp. 4–16, An Introduction To Hidden Markov.

Lennig, "Putting Speech Recognition to Work in The Telephone Network"., Computer, published by IEEE, pp.35–41, Aug. 1990.

IBM Technical Disclosure Bulletin, vol. 27, No. 7A, Dec. 1984, "Dynamic Modification of the Vocabulary of a Speech Recognitton Machine."

*Primary Examiner*—David R. Hudspeth
*Assistant Examiner*—Martin Lerner

[57] ABSTRACT

The invention relates to a method and apparatus for automatically generating probability tables (histograms) for a speech recognition dictionary for use in a speech recognition system from a listing containing call records. The method comprises the step of generating histograms representing the probabilities of localities being requested based on the calling pattern collected on the field by either a human operator or via an automatic process during calls. The method is particularly useful for generating an a priori advisor for a speech recognition dictionary used in an automated system for locality recognition.

28 Claims, 5 Drawing Sheets

METHOD AND APPARATUS FOR GENERATING AN A PRIORI ADVISOR FOR A SPEECH RECOGNITION DICTIONARY

FIELD OF THE INVENTION

This invention relates to a method and an apparatus for automatically performing desired actions in response to spoken requests. It is particularly applicable to a method and an apparatus for automatically providing desired information in response to spoken requests, as may be used to automate partially or fully telephone directory assistance functions. More specifically, the invention relates to a method and apparatus for generating an a priori advisor for a speech recognition dictionary from call records containing information about real individual directory assistance call transactions.

BACKGROUND OF THE INVENTION

In addition to providing printed telephone directories, telephone companies provide telephone directory assistance services. Users of these services call predetermined telephone numbers and are connected to directory assistance operators. The operators access directory databases to locate the directory listings requested by the users, and release the telephone numbers of those listings to the users.

Because telephone companies handle a very large number of directory assistance calls per year, the associated labor costs are very significant. Consequently, telephone companies and telephone equipment manufacturers have devoted considerable efforts to the development of systems that reduce the labor costs associated with providing directory assistance services.

In a typical assistance system the caller is first prompted to provide listing information, in other words to specify in what area resides the business or individual whose telephone number he seeks. If valid speech is detected, the speech recognition layer is invoked in an attempt to recognize the unknown utterance. On a first pass search, a fast match algorithm is used to select the top N orthography groups from a speech recognition dictionary. In a second pass the individual orthographies from the selected groups are re-scored using a more precise likelihood computation. The top orthography in each of the top two groups is then processed by a rejection algorithm that evaluates if they are sufficiently distinctive from one another so the top choice candidate can be considered to be a valid recognition.

Usually the speech recognition dictionary that contains the orthographies potentially recognizable by the speech recognition layer on a basis of a spoken utterance by a user is created by compiling a list of orthographies. In a specific example, a dictionary to be used for locality recognition may consist of a list of cities and countries. Because the likelihood of occurrence of each of the orthographies is different, a priori probabilities may be used to weigh the orthographies in the dictionary such as to give a greater bias to those having a higher probability of being uttered. This is commonly done by using statistical measurements such as assigning weights according to frequency of occurrence in a given speech utterance. For example in the case of the locality requests, probabilities may be set by assigning probabilities based on the population of the localities. Although the use of a-priori probabilities allows weighing preferentially frequently occurring orthographies, the model based on the population of each locality for creating the a priori advisor is not optimum. It has been observed that the actual calling pattern in a given geographical area cannot always be correlated to the population distribution in that area. Thus, the development of a priori advisors based solely on population distribution may lead to less accurate recognition systems.

Thus, there exists a need in the industry to develop improved automated methods for generating a speech recognition dictionary containing statistical data used to weigh orthographies in the dictionary.

OBJECTS AND STATEMENT OF THE INVENTION

An object of the invention is to provide an improved automated method for generating a speech recognition dictionary containing statistical data that provides a priori advisor functions.

Another object of the invention is to provide an apparatus for generating a speech recognition dictionary containing statistical data that provides a priori advisor functions.

A further object of the invention is a computer readable medium containing a program element that instructs a computer to process a listing containing call records to generate a speech recognition dictionary containing statistical data that provides a priori advisor functions.

As embodied and broadly described herein, the invention provides a method for generating a speech recognition dictionary for use in a speech recognition system, said method comprising the steps of:

providing a set of records of call transactions, each record including a first data element indicative of a geographical locality and a second data element indicative of a telephone number;

generating from said plurality of records a priori data structure including a plurality of probability data elements;

providing a set of orthographies, each orthography being potentially recognizable on a basis of a spoken utterance, each orthography being indicative of a geographical locality, at least some of said orthographies corresponding to probability data elements from said a priori data structure;

storing said orthographies and said probability data elements on a computer readable medium to allow said orthographies to be potentially recognizable by a speech recognition system on a basis of a spoken utterance by a user.

For the purpose of this specification the term "histogram" is used to designate an a priori data structure such as a table containing probability values for one or more of the orthographies in the dictionary. This data structure can be integrated to the speech recognition dictionary or it can be a separate entity from the dictionary.

For the purpose of this specification the expression "orthography" is a data element that can be mapped onto a spoken utterance that can form a single word or a combination of words.

The present inventor has made the unexpected discovery that a useful set of histograms applicable to a speech recognition dictionary may be automatically created by using calling records gathered from calling information from the directory assistance service and then using this data to construct a set of histograms. Typically, the listing contains entries about actual directory assistance transactions, such as calling number, called number and a locality identifier that potentially corresponds to an orthography in the speech recognition dictionary. In a specific example, the listing may be the statistics file generated by a telephone system such as ADAS+ in Quebec, Canada.

The knowledge of the calling pattern that can be extracted from such listing can be valuable in correctly recognizing the locality name since requests for automated directory assistance are likely to follow predetermined calling patterns. For example, a user residing in a certain locality is likely to request a telephone number in a locality closer to the source of the call rather than one situated further away. By observing actual call records, such as call records derived from automated directory call transactions, statistical information can be gathered to model this calling patterns. This statistical information can then be used in conjunction with acoustical matching between the spoken utterance and the orthographies in the speech recognition dictionary to improve the accuracy of the speech recognition operation. This approach is different from the technique that generates the a priori advisor according to a model based on heuristics, such as the population of the locality, for example. Deriving the calling pattern using the actual call records, rather than estimating it by a model yields much more precise data. Objectively, this approach is more difficult to implement in that additional steps are now required such as recording call transactions and then processing the resulting records to generate the probability data.

In a most preferred embodiment, the above-defined method is used to generate histograms for use in an automated directory assistance system. The list of call records is a listing providing for each entry, information such as called number, calling number and locality identifier. Such a listing can be obtained from telephone company installations, either automatically for using the intervention of a human operator that for every directory assistance request (transaction) will record the geographical location of the user through the user's NPA-NXX number as provided by the telephone network, the locality requested and also the number that the user dialed to access the directory assistance function. In a specific example, this latter data element can be either 411 or 555-1212 for local calls or NPA-555-1212 where NPA is the area code of the region where the subscriber whose telephone the caller seeks.

The method in accordance with the invention comprises the step of processing the call records to generate at least one histogram or a priori data structure. Such an a priori data structure contains a plurality of probability data elements. The next step of the method is to map the orthographies with which the a priori data structure will be used with corresponding probability data element. For the purpose of this specification the expression mapping an orthography to a corresponding data element involves in essence establishing a correspondence between a certain orthography and a probability data element so that this particular data element can be retrieved from the orthography. This can be achieved by associating with each probability data element an index or a pointer establishing a direct relation between the probability data element and the orthography. In general, the index can be any element that allows locating for a given orthography a corresponding entry in the a priori data structure. For example, the index may be a number, such as an integer value. In each histogram, such integer value is stored with the associated probability data element. During the speech recognition process, when assessing the a priori bias for a particular orthography, the index is used to locate the corresponding probability data element. Other possibilities also exist. For instance, the mapping operation can be effected by using an index that is a duplicate of the orthography itself stored with the corresponding probability data element. Here, the link to the probability data element can be established by searching the a priori data structure to locate the entry identical to the orthography and then extract the corresponding probability data element.

Most preferably, a plurality of a priori data structures are provided, each data structure corresponding to a give NPA-NXX (for the calling number) and called NPA combination. In the course of a given automated directory assistance transaction, the NPA-NXX combination of the calling number and called number are obtained from the telephone network and the a priori data structure corresponding to this combination is retrieved. The a priori bias for a given orthography is then established by extracting the probability data element associated with the index that is stored or otherwise associated with the orthography. Thus, a single index can be used to extract probability data elements from different a priori data structures, the particular a priori data structure used being selected on the basis of the NPA-NXX of the caller together with the called number.

As embodied and broadly described herein, the invention also provides a method for generating an a priori data structure for use in a speech recognition system, said method comprising the steps of:

a) recording a multitude of actual automated directory assistance call transactions occurring in a certain geographical zone subdivided in a plurality of localities;

b) storing for each recorded transaction in a) a record including a first data element indicative of a geographical location of a terminal at which a user has initiated the transaction and a second data element indicative of a locality identified by the user during the transaction;

c) processing the records created at step b to generate an a priori data structure including a plurality of probability data elements, said data elements reflecting patterns of directory assistance call transactions in the geographical zone;

d) providing a set of orthographies, each orthography being potentially recognizable on a basis of a spoken utterance, each orthography of said set being indicative of a locality of the geographical zone;

e) mapping orthographies from said set of orthographies to respective probability data elements of said a priori data structure, whereby allowing utilization of the probability data elements during selection of an orthography from said set as a potential match to a spoken utterance by a user.

As embodied and broadly described herein the invention also provides apparatus for generating a speech recognition dictionary for use in a speech recognition system, said apparatus comprising:

memory means for holding a set of records of call transactions, each recorded including a first data element indicative of a geographical locality and a second data element indicative of a telephone number;

a processor in operative relationship with said memory means;

a program element providing means for directing said processor to:

a) generate from said plurality of records an a priori data structure including a plurality of probability data elements;

b) map orthographies from a set of orthographies to corresponding probability data elements in said a priori data structure, each orthography being potentially recognizable on a basis of a spoken utterance, each orthography being indicative of a geographical locality from said set.

As embodied and broadly described herein, the invention also provides a machine readable medium containing a program element for instructing a computer to generate a speech recognition vocabulary for use in a speech recognition system, said computer including:

memory means for holding a set of records of call transactions, each record including a first data element indicative of a geographical locality and a second data element indicative of a telephone number;

a processor in operative relationship with said memory means;

said program element providing means for directing said processor to:
   a) generate from said plurality of records a data structure establishing a correspondence between a plurality of indices and probability data elements;
   b) map orthographies from a set of orthographies to corresponding indices in said data structure, each orthography being potentially recognizable on a basis of a spoken utterance, each orthography being indicative of a geographical locality from said set, whereby allowing to establish a correspondence between a certain orthography and a certain probability data element through an intervening index associated with said certain probability data element.

As embodied and broadly described herein the invention also provides a machine readable storage medium containing a speech recognition dictionary for use in an automated directory assistance system, said speech recognition dictionary including:

a set of orthographies, each orthography being potentially recognizable on a basis of a spoken utterance, each orthography being indicative of a geographical locality;

a plurality of a priori data structures, each data structure including a plurality of probability data elements;

each orthography being associated with a plurality of probability data elements from different a priori data structures, each orthography being recognizable on a basis of a spoken utterance, a probability data element, from a selected one of said plurality a priori data structures, associated with said each orthography permitting to weigh said each orthography during a process for determining a degree of likelihood between said each orthography and the spoken utterance.

As embodied and broadly described herein the invention also extends to a method for using the speech recognition dictionary defined above for recognizing a spoken utterance.

DESCRIPTION OF A PREFERRED EMBODIMENT

As an introductory comment it should be pointed out that the invention does not directly relate to the structure and operation of a speech recognition system such as an automated directory assistance system. Rather, the invention is concerned with a method and apparatus for generating a speech recognition dictionary, featuring an improved a priori advisor that can be used in a speech recognition system, such as an automated directory assistance system. For more information on the structure and operation of an automated directory assistance system the reader may refer to the following documents whose contents are hereby incorporated by reference.

TABLE 1

Patents related to speech recognition and directory assistance systems

| Patent # | Inventor |
|---|---|
| Canadian Patent documents | |
| 2,091,658 | Lennig et al. |
| U.S. PAT. NOS. | |
| U.S. Pat. Nos. | Inventor |
| 5,488,652 | Gregory, J. Bielby et al. |
| 4,164,025 | Dubnowski et al. |
| 4,751,737 | Gerson et al. |
| 4,797,910 | Daudelin |
| 4,959,855 | Daudelin |
| 4,979,206 | Padden et al. |
| 5,050,215 | Nishimura |
| 5,052,038 | Shepard |
| 5,091,947 | Ariyoshi et al. |
| 5,097,509 | Lennig |
| 5,127,055 | Larkey |
| 5,163,083 | Dowden et al. |
| 5,181,237 | Dowden |
| 5,204,894 | Darden |
| 5,274,695 | Green |
| 5,515,475 | Gupta et al. |
| 5,307,444 | Tsuboka |
| 4,751,736 | Gupta et al. |
| 5,226,044 | Gupta et al. |
| 4,956,865 | Lennig et al. |
| 5,390,278 | Gupta et al. |
| 5,086,479 | Takenaga et al. |

TABLE 2

Prior art publications related to speech recognition and directory assistance systems

PRIOR ART

| TITLE | AUTHOR | SOURCE |
|---|---|---|
| Dynamic Adaptation of Hidden Markov Model for Robust Speech Recognition | | 1989, IEEE International Symposium on Circuits and Systems, vol. 2, May 1989 pp. 1336–1339 |
| Dynamic Modification of the Vocabulary of a Speech Recognition Machine | | IBM Technical Disclosure Bulletin, vol. 27, No. 7A, Dec. 1984 |
| Adaptive Acquisition of Language, | Gorin et al. | Computer Speech and Language, vol. 5, No. 2 Apr. 1991, London, GB, pp. 101–132 |
| Automated Bilingual Directory Assistance Trial In Bell Canada | Lennig et al, | IEEE Workshop on Interactive Voice Technology for Telecom Applications, Piscataway, NJ. Oct. 1992. |
| Unleashing The | Labov and | Telesis, Issue 97, |

TABLE 2-continued

Prior art publications related to speech recognition and directory assistance systems

PRIOR ART

| TITLE | AUTHOR | SOURCE |
| --- | --- | --- |
| Potential of Human-To-Machine Communication | Lennig, | 1993, pp. 23–27 |
| An introduction To Hidden Markov Models | Rabiner and Juang | IEEE ASSP Magazine, Jan. 1986, pp. 4–16 |
| Putting Speech Recognition to Work in The Telephone Network | Lennig, | Computer, published by IEEE Computer Society, vol. 23, No. 8, Aug. 1990 |
| Flexible Vocabulary Recognition of Speech Over The Telephone | Lennig et al. | IEEE Workshop on Interactive Voice Technology for Telecom Applications, Piscataway, NJ, Oct. 1992 |
| Large Vocabulary Continuous Speech Recognition: a Review | Steven Young | IEEE Automatic Speech Recognition Workshop, September 16, 1995 |
| Putting Speech Recognition to Work in the Telephone Network | Matthew Lennig | IEEE (August 1990) reprinted from Computer |

This following section describes an apparatus and a method of building speech recognition histograms that contain probability data elements reflecting the calling patterns in a certain geographical area. These histograms are then mapped onto the speech dictionary in order to supply probability information to the speech recognition system. In the preferred embodiment of this invention, the speech recognition dictionary is composed of N orthographies, each orthography being indicative of a locality potentially recognizable on the basis of a spoken utterance by the user. It may be desirable to add orthographies that are not representative of localities, herein referred to as "decoys", but are commonly spoken by user of directory assistance services. For example expressions such as "Excuse me", "I don't know" do not represent localities but occur frequently. The probability of such orthographies may be computed by using screened tokens. The method and apparatus described by this invention generate K histograms each with N entries. An entry in each of the histograms corresponds to an orthography in the speech recognition dictionary.

As previously mentioned, the histograms are used to provide probability data in order to weigh the orthographies in the dictionary such as to give preference to frequently occurring requests. The probability that a certain locality is the one matching the spoken utterance is conditioned on two separate elements namely the calling NPA-NXX and the called number. This a priori estimate is usually expressed as P (called locality|calling NPA-NXX, called number). In the province of Quebec, the called number can be either 411 or 555-1212 or NPA-555-1212. Therefore the a priori estimates are reduced to three possible elements:

A) P (called locality|calling NPA-NXX, 411 or 555-1212),

B) P (called locality|calling NPA-NXX, NPA-555-1212), and

C) P (called locality|called NPA).

To estimate the probabilities resulting from possibilities A, B and C above, the speech recognition dictionary has a number of histograms generated by the method and apparatus in accordance with the invention that establish a relationship between localities and probability data. Preferably, a histogram is estimated for each relevant NPA-NXX combination of called NPA. Preferably a large number of call records are used to generate the histograms such as to reflect more accurately the calling pattern.

Each histogram may be viewed as a data structure such as a table including two columns, and a multitude of records. Each record has two fields, the first field containing an index or a memory address allowing mapping the index to an orthography entry in the speech recognition dictionary and a second field containing an associated probability value. In circumstances where minimizing memory usage is an issue, the first column may be replaced and a single address that indicates the location of the beginning of the dictionary listing in memory. In this particular circumstance, the order of all the localities and the entries in the histograms will have to be the same such as to ensure consistency. Other variations are possible for the storage of the histograms. Structures differing from the ones described above do not detract from the spirit of the invention.

In a specific example to illustrate the method, let us take the region of Montreal with an NPA of 514 which comprises several localities such as Outremont, Westmount, Hampstead and so on. The speech recognition dictionary includes an orthographic entry for each of these localities. In addition, it may contain orthographies which do not represent localities but which are often uttered by a user requesting directory assistance. These orthographies, designated as decoys or imposters, are used to represent expressions such as "I don't know" and "I want an operator" so that the speech recognition system can more accurately detect the occurrence of such orthographies. Once the dictionary has been established, directory assistance calls are recorded over a period of time ranging from a few days to a few months depending on the number of directory assistance calls. The greater the number of calls the greater the accuracy of the dictionary will be. Preferably from each directory assistance call the calling NPA-NXX, the called number and the locality requested is recorded in a log file either by a human operator or by an automatic directory assistance system.

In the preferred embodiment of this invention, the histogram building apparatus uses data obtained during actual directory assistance transactions. As a specific example, the raw data that is input to the histogram building apparatus is the statistic file generated by the directory assistance system such as ADAS+, or any other record form generated by the telephone company. The statistics file, presented in electronic format, provides information about each call. A sample listing is given in table 3 below:

TABLE 3

Sample listing in a telephone record file

| Calling Number | Called Number | Locality Identifier |
| --- | --- | --- |
| 514-486-1234 | 411 | 4 MONTR |
| 514-764-3453 | 555-1212 | JE ST |
| 418-862-5729 | 411 | ST FOY |
| 819-759-6372 | 418-555-1212 | SHRBK |
| 418-817-9754 | 514-555-1212 | 4 MONTR |
| 514-781-9716 | 555-1212 | 4 MONTR |
| 819-876-8273 | 819-555-1212 | HULL |

As shown in table 3, the first entry in each record is the telephone number of the caller in the form NPA-NXX-XXXX, the second entry is the directory assistance number dialed by the caller to initiate the transaction and the third is the identifier of the locality requested by the caller, as recorded by the human operator or by the automated directory assistance system. The second column is 411, 555-1212 or NPA-555-1212 which are the three numbers used for directory assistance in the province of Quebec. The third column represents the locality the caller specified. The identifier of the locality may be the complete name of the locality, a number referring to a locality or a cryptic code used to abbreviate the locality name. For example the string "4 MONTR" in the above table is used to designate the city of Montreal.

In another segment of the invention, we also collect random calls and screen what the caller spoke when requesting a locality. These speech instances are referred to as "screened tokens" or "screened speech token". Preferably, more than 20 000 of such tokens are screened in order to obtain a representative measurement of the speech pattern. A table is then built to compile the number of occurrences of each of the orthographies in the list of screened tokens. Once this computation is complete, a probability for each of these tokens is computed by dividing for each orthography the number of occurrences by the total number of screened tokens.

Figure 1:
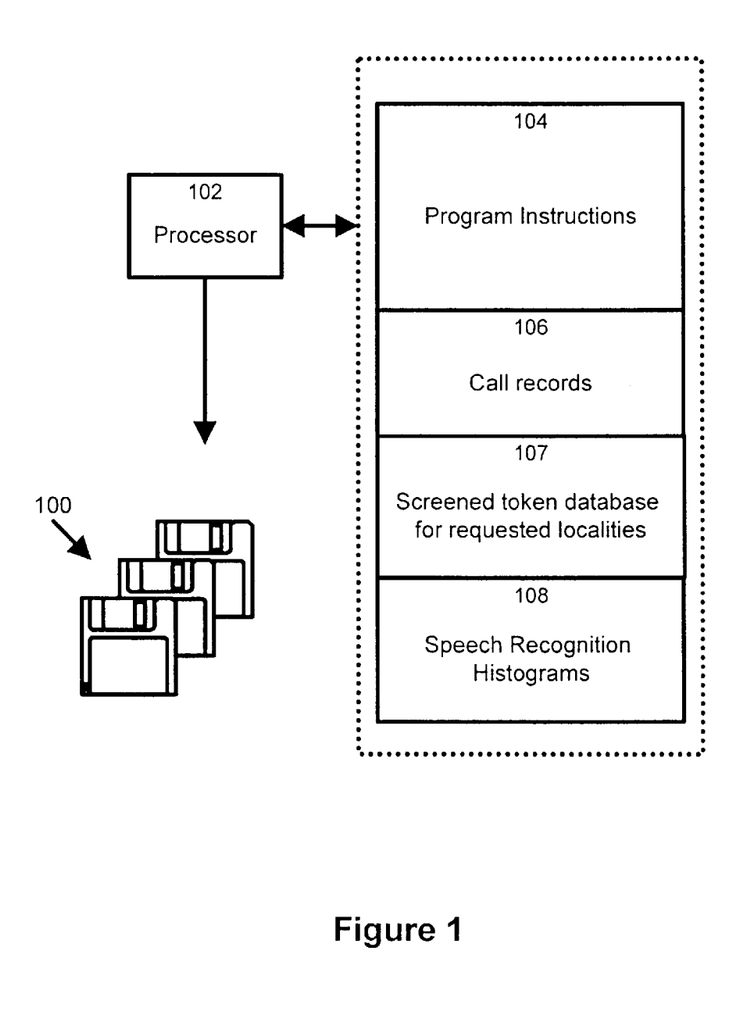
FIG. 1 is a functional block diagram of an apparatus in accordance with the invention for generating speech recognition dictionary histograms based on information contained in call records.
Figure 2:
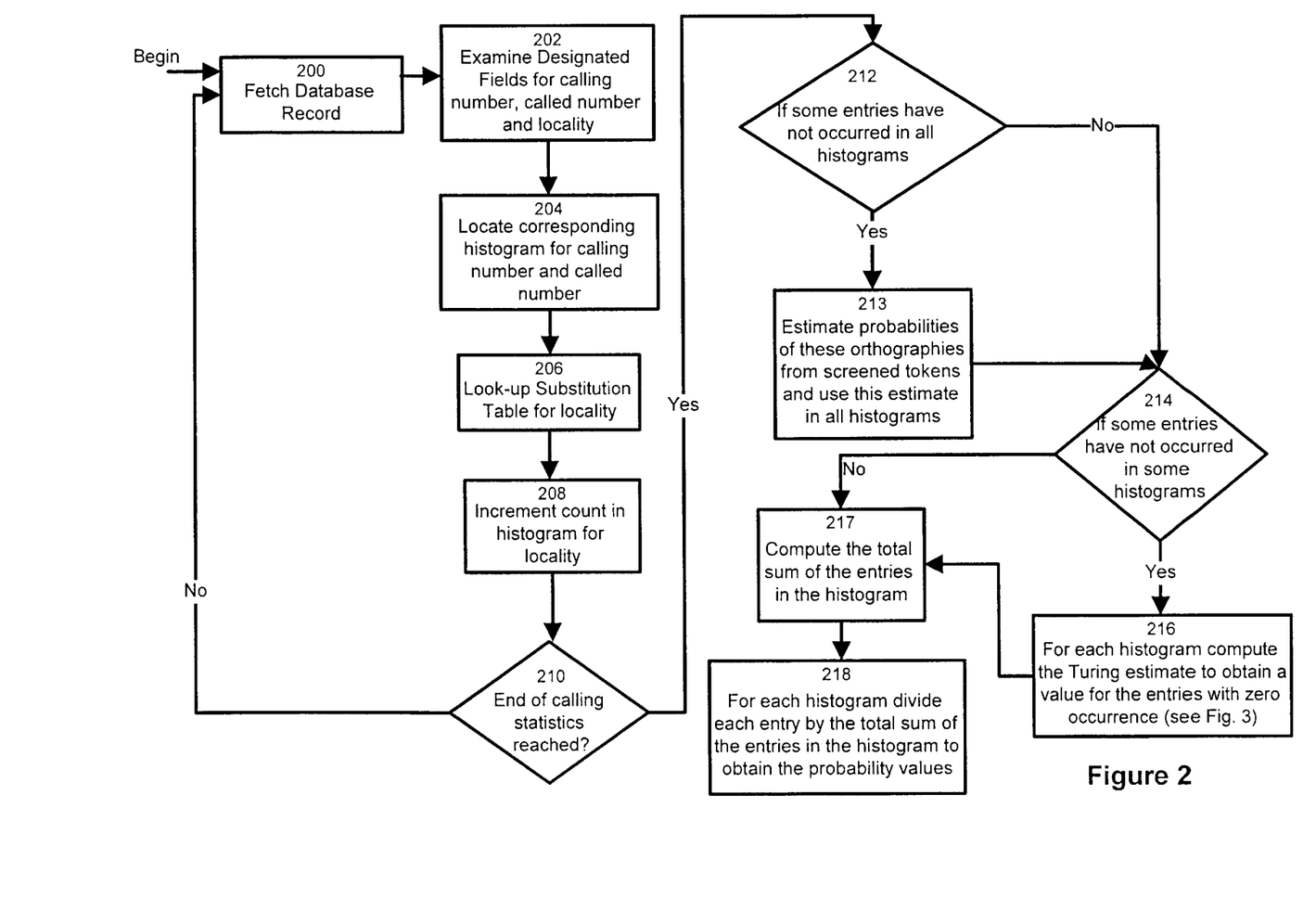
FIG. 2 is a flow chart illustrating the logic of the program element that operates the apparatus illustrated in FIG. 1.
Figure 3:
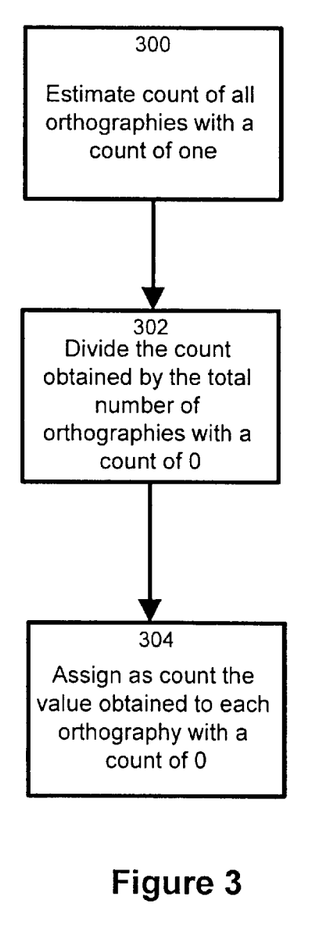
FIG. 3 is a flow chart illustrating the Turing probability computation.

The apparatus for generating the histograms in accordance with the invention is illustrated in FIG. 1. The apparatus includes a processor 102 in operative relationship with a memory having four segments, namely a first segment 104 containing program instructions, a second segment 106 containing call records, and a third segment 107 containing screened speech tokens and the fourth segment 108 containing the histograms. The flow chart illustrating the program operation is depicted in FIG. 2. A call record as one of those shown in a row of table 3 is fetched from memory at step 200 and the fields holding the called number, calling number and requested locality are examined in 202. The histogram corresponding to the calling information (NPA-NXX) is located at step 204 and, based on the locality identifier in the record the correct entry in this histogram is located 206 by looking up the appropriate index for the locality entry. Following this, the counter in the histogram is incremented at step 208 for the entry corresponding to the locality selected. If the end of the record file has not been reached, as shown at decision step 210, the process re-iterates by fetching a new record at step 200. If the end of the record file has been reached as determined at step 210, in the case where some localities are not present in the call records file, the probability of those orthographies will be zero up to this point which may cause some difficulties in practice because those orthographies would never be selected by the speech recognizer. Therefore, in order to alleviate this problem, two measures are taken. First a test is made to determine if some orthographies have a count of zero in every histogram 212. In the affirmative, the orthographies have their probabilities estimated from the screened speech tokens 213 and are assigned the same probability estimate in each histogram. Following this or if condition 212 is false, a test is performed to estimate if some of the orthographies have a count of zero in some but not all histograms 214. In the affirmative the orthographies are given the Turing estimate 216. The Turing estimate is an algorithm developed during the Second World War in order to decipher encoded messages while taking into account items which did not occur in a particular sample of a message. In simple terms this algorithm is shown in FIG. 3. The number of orthographies with a count of one is first computed at step 300. According to the algorithm, this number approximates the mass of all orthographies with a count of zero. The total number of entries with a count of zero then divides this mass at step 302 and the result is assigned to the entries with a count of zero, at step 304. Following this, the total sums of entries in each histogram are computed at step 217 (refer back to FIG. 2). The sums then divide each entry in their respective histogram 218 in order to obtain a probability estimate for each entry (value in the range from 0 to 1).

Preferably, the resulting histograms are integrated into a speech recognition system where the histograms are used to weigh the entries (orthographies) in a speech recognition dictionary. The appropriate histogram to use in each case is selected based on the called number and the calling NPA-NXX and is preferably accessed via a histogram identifier in a look up table. The following example will illustrate in general terms the operation of such a system.

The speech recognition system in this example comprises a set of histograms that can be addressed on the basis of a histograms identifier stored in a lookup table shown in table 4 below. These indices depend on both the called number and the calling NPA-NXX and NPAs. The left column corresponds to called number and the right column corresponds to the calling NPA-NXX or NPA followed by the histogram index. For example if the called number were 411 and the calling number 514-421-7563 then histogram 5 would be selected.

TABLE 4

Sample of a prior table with indices to the histograms

| Called Number | Calling NPA-NXX; histogram index |
|---|---|
| 411 or 555-1212 | 514-620:4; 514-421:5; 819-829:6; 418-621:7; 418:1; 514:2; 819:3; |
| 418-555-1212 | 418-621:7; 418:1; |
| 514-555-1212 | 514-620:4; 514-421:5; 514:2; |
| 819-555-1212 | 819-829:6; 819-3; |

In the preferred embodiment of this invention two separate histogram sets can be referred to depending upon the particular case involved. The first histogram set includes a plurality of individual histograms, each histogram being associated with a given NPA. In a specific example that could apply to the province of Quebec, three histograms would be provided, for the respective NPAs 514, 418 and 819. The histograms are illustrated below and have N records each and are therefore associated with a speech recognition dictionary containing N orthographies;

| Locality index | Probability value |
|---|---|
| NPA = 514 | |
| Locality (0) | 0.055 |
| Locality (1) | 0.100 |
| Locality (2) | 0.050 |
| Locality (3) | 0.003 |
| — | — |
| Locality (N) | 0.040 |
| NPA = 418 | |
| Locality (0) | 0.040 |
| Locality (1) | 0.008 |
| Locality (2) | 0.200 |
| Locality (3) | 0.001 |
| — | — |
| Locality (N) | 0.034 |
| NPA = 819 | |

| Locality index | Probability value |
| --- | --- |
| Locality (0) | 0.045 |
| Locality (1) | 0.060 |
| Locality (2) | 0.005 |
| Locality (3) | 0.009 |
| — | — |
| Locality (N) | 0.013 |

The second histogram set includes an individual histogram for each NPA-NXX combination available. The following is an example of two histograms:

| Locality index | Probability value |
| --- | --- |
| NPA-NXX = 514–620 | |
| Locality (0) | 0.028 |
| Locality (1) | 0.067 |
| Locality (2) | 0.012 |
| Locality (3) | 0.102 |
| — | — |
| Locality (N) | 0.083 |
| NPA-NXX = 819–820 | |
| Locality (0) | 0.045 |
| Locality (1) | 0.003 |
| Locality (2) | 0.071 |
| Locality (3) | 0.001 |
| — | — |
| Locality (N) | 0.043 |

Figure 4:
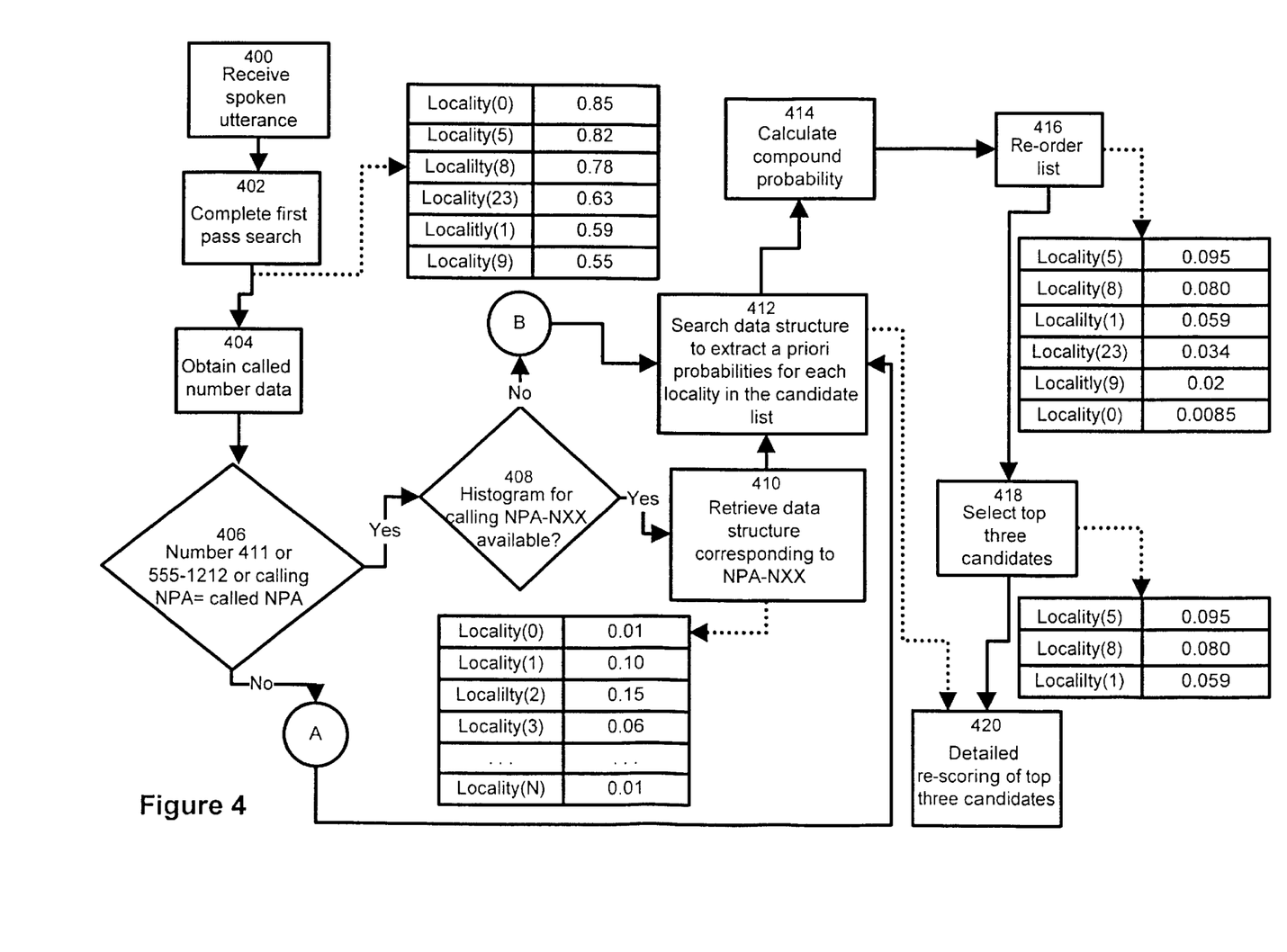
FIGS. 4, 5 & 6 are flowcharts illustrating the operation of a speech recognition apparatus utilizing the histograms generated with the method and apparatus in accordance with the spirit of the invention.

During the operation of the speech recognition system the information contained in these histograms is consulted and contributes to determine the orthography that the system will output as top choice. The flowchart in FIG. 4 illustrates the orthography selection process in greater detail.

When the spoken utterance is received at step 400, the signal is analyzed by applying a fast match algorithm, as shown at step 402. The fast match algorithm generates a candidate list containing six orthographies organized in the table depicted at FIG. 4. For more information on the fast match algorithm, the user may wish to consult Gupta V. N., Lennig M., Mermelstein P. "A fast search strategy in a large vocabulary word recogniser" INRS-Telecommunications. J. Acoust. Soc. Am. 84 (6), December 1988, p.2007 and U.S. Pat. No. 5,515,475 by inventors Gupta V. N. & Lennig M. The content of these documents is incorporated herein by reference. The orthographies are ranked on the basis of their probability value of constituting an acoustic match to the spoken utterance. At step 404 of the process, the number that the user dialed to obtain directory assistance is analyzed. If this number is a local number (such as 411 or 555-1212 for the province of Quebec), in other words no NPA has been dialed or the NPA corresponds to the local region, the process at the conditional step 406 is answered in the affirmative. If any other number has been dialed, the conditional step branches to processing block A, that will be discussed later in greater detailed in connection with FIG. 5.

Conditional step 408 determines if the NPA-NXX for the telephone number of the user who has requested the directory assistance function is available and if an a priori histogram exists for that NPA-NXX combination. If the NPA-NXX combination is not available or has not been programmed into the system, in other words no histogram that provides probability values based on calling patterns for this NPA-NXX combination exists, the conditional step 408 is answered in the negative and processing continues at block B that will be described in greater detail later in connection with FIG. 6. However, if the NPA-NXX combination is available and a histogram exists for that combination in the system, the process continues at step 410 where the histogram is retrieved from memory and prepared for further processing. At step 412, the histogram is searched for each locality present in the list of candidates generated as a result of the first pass search. If the search is successful, the a priori probabilities associated with the locality name are obtained from the histogram and stored in memory. At step 414, the system computes a compound probability based on the probability value of acoustical match and the probability value extracted from the a priori advisor. In the present embodiment the following equation is used to compute the compound probabilities also referred to as log likelihoods in the literature:

Log (compound probability) = log (acoustic probability) +

0.007 × [number of speech frames ∗ log (a priori probability)]

Once the compound probability value is obtained, the list of candidates is re-ordered 416. The re-ordered list is shown in FIG. 4. By comparison to the original list, a number of entries have changed position. Now, Locality (5), Locality (8) and Locality (1) occupy the first three slots, while previously those positions were taken by localities Locality (0), Locality (5) and Locality (8).

At step 418, the top three candidates in the re-ordered list are taken and passed to the re-scoring stage 420 where a full acoustic match analysis with the spoken utterance is performed so an orthography can be chosen as the best possible match with the spoken utterance.

Figure 5:
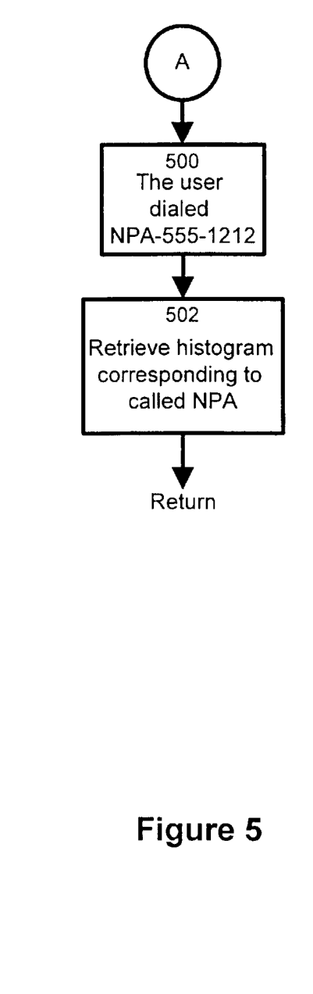

Returning back to conditional step 406, should this step by answered in the negative, which indicates that a determination was made that the user has dialed the telephone number of the automated directory assistance system preceded by an NPA (area code) combination 500, the process branches to flow chart block A illustrated at FIG. 5. At step 502, the system uses the default histogram corresponding to that NPA the NPA being the one of the called number not the one of the caller's telephone number.

Conditional step 408 is answered in the negative when the calling NPA-NXX combination is not available or not programmed in the system. In this case, the system defaults to a procedure that establishes the compound probability value based on histograms associated with the called NPA rather than the calling NPA-NXX. The flow chart block B illustrated in FIG. 6 describes the procedures in detail. More specifically, at functional block 600 the NPA of the called number is obtained. The histogram corresponding to this NPA is obtained as shown in block 602. The processing is then resumed at step 412 in FIG. 4 where the compound probability values are computed on the basis of the probability value extracted from the histogram and the probability value corresponding to the acoustical match is used to re-order the candidate list.

Figure 6:
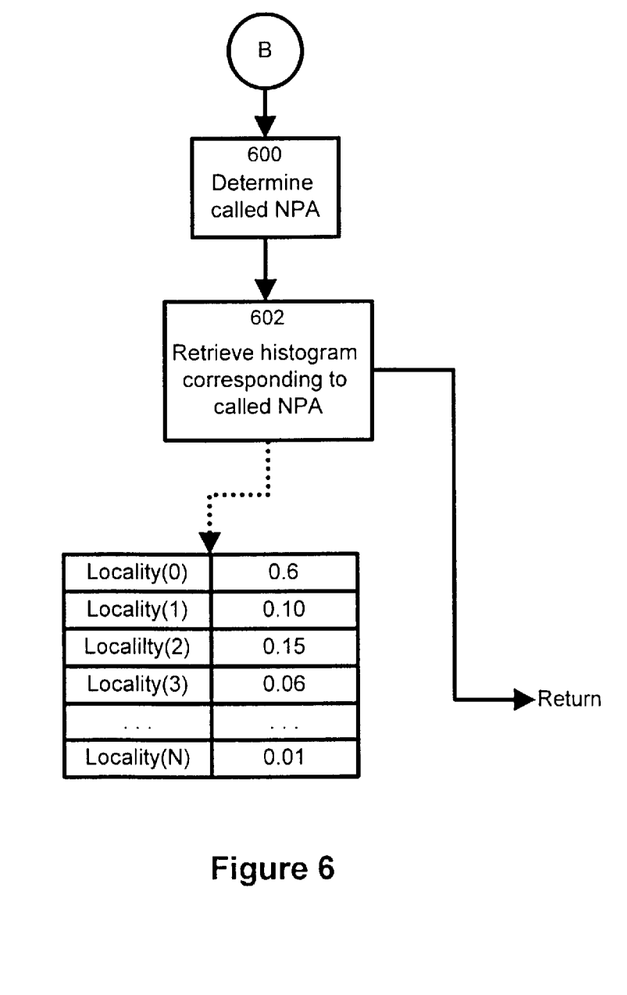

In the example of the operation of the speech recognition system depicted at FIGS. 4, 5 and 6, the probability derived from the histogram is taken into account as a separate step subsequent to the 1st pass search done solely on the basis of acoustic match. The operation of the system can be simplified by integrating the histograms directly into the speech recognition dictionary. This can be effected by identifying the applicable histogram before the 1st pass search is initiated. The selection of a given orthography during this 1st pass search is then effected on the basis of the acoustic match and also on the basis of the a priori data provided by the applicable histogram.

The above description of a preferred embodiment should not be interpreted in any limiting manner since variations and refinements can be made without departing from the spirit of the invention. For instance, although an example of the invention has been provided above with strong emphasis on an automated directory assistance system, the method and apparatus for generating the histograms for the speech recognition dictionary could also be used in other types of speech recognition systems. The scope of the invention is defined in the appended claims and their equivalents.

We claim:

1. A method for generating a speech recognition dictionary suitable for use in a speech recognition unit of a directory assistance system, said method comprising:
   providing a plurality of records of call transactions, a record including a first data element indicative of a geographical locality and a second data element indicative of at least a portion of a telephone number dialed on a terminal to access a directory assistance function;
   generating from the plurality of records an a priori data structure including a plurality of probability data elements, the plurality of probability data elements being derived at least in part on the basis of the second data elements;
   providing a set of vocabulary items potentially recognizable on a basis of a spoken utterance, each vocabulary item being indicative of a geographical locality;
   associating at least some of the vocabulary items to probability data elements from said a priori data structure;
   storing the vocabulary items and the associated probability data elements on a computer readable medium capable of being processed by the speech recognition unit of the directory assistance system to perform recognition of an utterance spoken by a user and indicative of a geographical locality, the recognition of the spoken utterance being conditioned on a basis of a telephone number dialed by the user to access a directory assistance function.

2. A method as defined in claim 1, wherein each probability data element in said a priori data structure is correlated to a frequency of a predetermined first data element in a sub-set of said plurality of records of directory assistance call transactions.

3. A method as defined in claim 2, further comprising providing in said a priori data structure a plurality of indices, each index being associated with a corresponding probability data element, each vocabulary item being associated with a corresponding index, whereby allowing to establish an association between a certain vocabulary item and a certain probability data element through an intervening index associated with said certain probability data element.

4. A method as defined in claim 3, comprising generating a plurality of a priori data structures, each a priori data structure associating probability data elements to vocabulary items.

5. A method as defined in claim 4, wherein each a priori data structure corresponds to a different telephone number at which a directory assistance function can be accessed.

6. A method as defined in claim 5, comprising assigning to each a priori data structures a data structure identifier.

7. A method as defined in claim 6, wherein the data structure identifier is indicative of at least at portion of a telephone number to be dialed to access a directory assistance function.

8. A method as defined in claim 7, wherein the at least a portion of a telephone number to be dialed to access a directory assistance function includes the NPA of a telephone number to be dialed to access a directory assistance function.

9. A method as defined in claim 1, wherein records in said plurality of records of call transactions include a third data element indicative of at least a portion of a telephone number associated to the terminal at which a directory assistance function was invoked.

10. A method as defined in claim 9, wherein said a priori data structure is a data structure of a first type, the method further comprising generating from said plurality of records an a priori data structure of a second type including a plurality of probability data elements derived at least in part on the basis of the third data elements, the method further comprising associating at least some of the vocabulary items to probability data elements from said a priori data structure of a second type.

11. A method as defined in claim 1, comprising the step of computing at least one of said probability data elements by utilizing a Turing estimate algorithm.

12. An apparatus for generating a speech recognition dictionary suitable for use in a speech recognition unit of a directory assistance system, said apparatus comprising:
   a memory for holding a plurality of records of call transactions, a record including a first data element indicative of a geographical locality and a second data element indicative of at least a portion of a telephone number dialed on a terminal to access a directory assistance function;
   a processor in operative relationship with said memory;
   a program element suitable to be executed on said processor, said program element being operative for directing said processor to:
      a) generate from said plurality of records an a priori data structure including a plurality of probability data elements, the plurality of probability data elements being derived at least in part on the basis of the second data elements;
      b) map vocabulary items from a set of vocabulary items to probability data elements in said a priori data structure, the vocabulary items in the set of vocabulary items being potentially recognizable on a basis of a spoken utterance, each vocabulary item in the set of vocabulary items being indicative of a geographical locality.

13. An apparatus as defined in claim 12, wherein each probability data element in said a priori data structure is correlated to a frequency of a predetermined first data elements in a sub-set of said plurality of records of directory assistance call transactions.

14. An apparatus as defined in claim 13, wherein said a priori data structure includes a plurality of indices, each index being associated with a corresponding probability data element, each vocabulary item being associated with a corresponding index, whereby allowing to establish an association between a certain vocabulary item and a certain probability data element through an intervening index associated with said certain probability data element.

15. An apparatus as defined in claim 14, wherein said program element directs said processor to generate a plurality of a priori data structures, each a priori data structure associating probability data elements to vocabulary items.

16. An apparatus as defined in claim 15, wherein each a priori data structure corresponds to a different telephone number at which a directory assistance function can be accessed.

17. An apparatus as defined in claim 16, wherein said program element directs said processor to assign to each a priori data structure a data structure identifier.

18. An apparatus as defined in claim 17, wherein the data structure identifier is indicative of at least of portion of a telephone number to be dialed to access a directory assistance function.

19. An apparatus as defined in claim 18, wherein the at least a portion of a telephone number to be dialed to access a directory assistance function includes the NPA of a telephone number to be dialed to access a directory assistance function.

20. An apparatus as defined in claim 12, wherein records in said plurality of records of call transactions include a third data element indicative of at least a portion of a telephone number associated to the terminal at which a directory assistance function was invoked.

21. An apparatus as defined in claim 20, wherein said a priori data structure is a data structure of a first type, wherein said program element directs said processor to generate from said plurality of records an a prior data structure of a second type including a plurality of probability data elements derived at least in part on the basis of the third data elements, said program element further directing said processor to associate at least some of the vocabulary items to probability data elements from said a priori data structure of a second type.

22. An apparatus as defined in claim 21, wherein said program element directs said processor to compute at least one of said probability data elements by utilizing a Turing estimate algorithm.

23. An apparatus as defined in claim 12, wherein said program element directs said processor to compute at least one of said probability data elements by utilizing a Turing estimate algorithm.

24. A machine readable medium containing a program element for instructing a computer to generate a speech recognition vocabulary suitable for use in a speech recognition unit of a directory assistance system, said computer including:
  memory means for holding a plurality of records of call transactions, a record including a first data element indicative of a geographical locality and a second data element indicative of at least a portion of a telephone number dialed on a terminal to access a directory assistance function;
  a processor in operative relationship with said memory means;
  a program element suitable to be executed on said processor, said program element providing means for directing said processor to:
    a) generate from said plurality of records an a priori data structure including a plurality of probability data elements, the plurality of probability data elements being derived at least in part on the basis of the second data elements;
    b) map vocabulary items from a set of vocabulary items to probability data elements in said a priori data structure, the vocabulary items in the set of vocabulary items being potentially recognizable on a basis of a spoken utterance, each vocabulary item in the set of vocabulary items being indicative of a geographical locality.

25. A method for generating an a priori data structure suitable for use in a speech recognition unit of a directory assistance system, said method comprising:
  a) recording a multitude of directory assistance call transactions occurring in a certain geographical zone subdivided in a plurality of localities;
  b) storing for each recorded directory assistance call transaction a record including a first data element indicative of a locality identified by the user during the directory assistance call transaction and a second data element indicative of at least a portion of a telephone number dialed by the user to initiate the directory assistance call transaction;
  c) processing the records created at step b) to generate an a priori data structure including a plurality of probability data elements, said plurality of probability data elements being derived at least in part on the basis of said second data elements;
  d) providing a set of vocabulary items, each vocabulary items being potentially recognizable on a basis of a spoken utterance;
  e) associating vocabulary items form said set of vocabulary items to probability data elements of said a priori data structure, whereby allowing utilization of the probability data elements during selection of vocabulary item from said set of vocabulary items as a potential match to a spoken utterance by a user.

26. A speech recognition unit for use in a directory assistance service, said speech recognition unit comprising:
  a) a first input for receiving a first signal derived from a spoken utterance indicative of a geographical locality;
  b) a second input for receiving a second signal indicative of at least a portion of a telephone number dialed by a user to access a directory assistance function;
  c) a processing unit coupled to said first and to said second inputs for performing speech recognition on the first signal, the speech recognition being conditioned on the second signal;
  d) an output coupled to said processing unit for releasing a signal representative of a vocabulary item identified by said processing unit as being a match to the spoken utterance.

27. A speech recognition unit as defined in claim 26, comprising a speech recognition dictionary including a set of vocabulary items, the vocabulary items in the set being indicative of geographical localities and being potentially recognizable on a basis of the first signal, said processing unit being operative during the speech recognition on the first signal for determining a degree of likelihood between individual vocabulary items and the first signal.

28. A speech recognition unit as defined in claim 27, wherein said processing unit being operative to weigh on a basis of the second signal vocabulary items in the set when determining a degree of likelihood between individual vocabulary items and the first signal.

* * * * *